No. 650,219. Patented May 22, 1900.
F. W. BARHOFF.
STORAGE CELL.
(Application filed July 29, 1899.)
(No Model.)
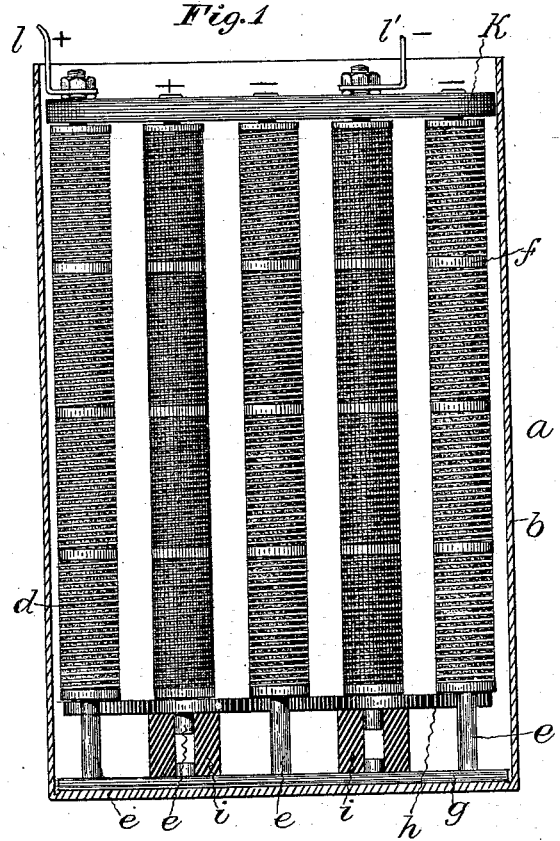
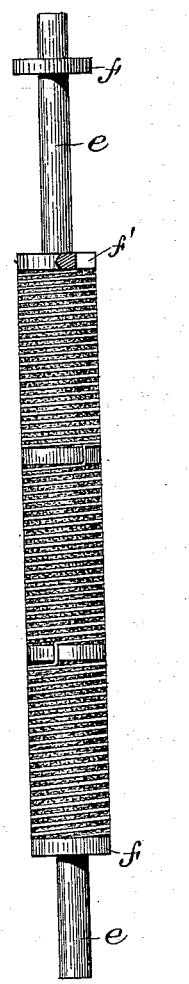
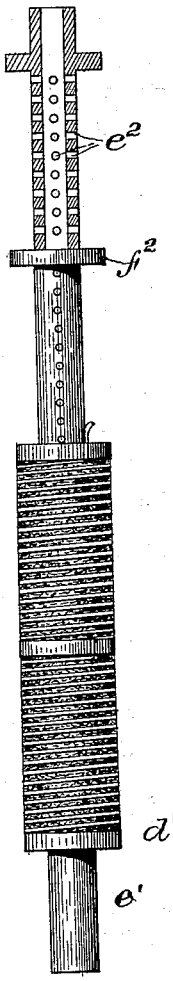
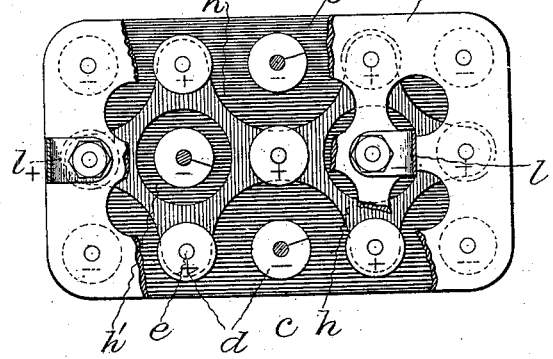
Witnesses:
Wm H. Barker
Anna P. Coffrin
Inventor:
Fred W. Barhoff
by Chas. L. Burdett
Attorney
THE NORRIS PETERS CO., PHOTO-LITHO., WASHINGTON, D. C.

UNITED STATES PATENT OFFICE.

FRED W. BARHOFF, OF HARTFORD, CONNECTICUT, ASSIGNOR TO THE HARTFORD ACCUMULATOR COMPANY, OF SAME PLACE.

STORAGE-CELL.

SPECIFICATION forming part of Letters Patent No. 650,219, dated May 22, 1900.

Application filed July 29, 1899. Serial No. 725,517. (No model.)

*To all whom it may concern:*

Be it known that I, FRED W. BARHOFF, a citizen of the United States, and a resident of Hartford, in the county of Hartford and State of Connecticut, have invented certain new and useful Improvements in Storage-Cells, of which the following is a full, clear, and exact description, whereby any one skilled in the art can make and use the same.

My invention relates to the class of apparatus used to produce an electric current after having been charged by the passage of an electric current therethrough; and the object is to produce a storage-cell or accumulator in which an increased efficiency may be obtained with a less weight of material as compared with prior structures of the same class.

To this end my invention consists in the cell or accumulator as a whole, in the sectional electrode, and in the details of the parts and their combination, as hereinafter described, and more particularly pointed out in the claims.

Referring to the drawings, Figure 1 is a view in side elevation of a cell with parts broken away to show construction. Fig. 2 is a plan view of the cell with parts broken away in horizontal section. Fig. 3 is a detail view, on an enlarged scale, of one form of the electrode. Fig. 4 is a detail view, on an enlarged scale, of a modified form of the electrode.

In the accompanying drawings, the letter $a$ denotes the storage-cell as a whole, in which there is a vessel $b$ to contain the active liquid, and a grid $c$, which forms the support for the active elements, this grid being, however, of special construction and in its elements, as well as a whole, forming a feature of my invention. The electrode $d$ in this accumulator is made up of a core $e$, on which a series of flanges $f$ are secured in such manner as to divide this core into several distinct sections limited at each end by the fixed flanges, which form abutments. On the core and between each two of the flanges or abutments a series of projecting flanges are arranged with free spaces between them, and this is preferably accomplished by winding a thin ribbon of lead helically upon the core, leaving between each turn of the coil a space in which peroxid of lead or spongy lead may be held as the element is to serve either as a positive or a negative element, the peroxid being formed on the elements joined up to the positive plate and the metallic lead on the elements joined up to the negative plate as the cell is being charged. These electrodes $d$ are arranged, preferably, in a vertical position in the cell and of a length and number determined by the desired power of the cell. In the form shown fifteen of the electrodes are shown grouped in a single cell and properly spaced. Near the bottom of the cell the core of one set of elements—as, for instance, the positive—are electrically connected to the plate $g$, while the negative electrodes are electrically connected to the negative plate $h$, the two plates being separated by the insulators $i$, of suitable material, as gutta-percha.

At the upper end of the cell a plate $k$ of non-conducting material is used to support the electrodes at the upper end and hold them in proper relation to each other. The upper end of the core of each electrode is preferably headed over to form a species of rivet, with the exception of the cores of two of the electrodes, which, respectively, belong to the positive set and the negative set of elements. On the projecting end of these two latter cores contact-pieces $l$ and $l'$ are secured, as by means of nuts attached to the threaded outer end of the core.

The electrode is preferably made up of a core $e$ of hardened lead alloy and the flanges $f$ of the same material, so as to give sufficient rigidity to the parts. The ribs or flanges, formed as by means of the thin ribbon of lead wound helically about the core, are united at the end of each section so that this ribbon or series of flanges is practically electrically continuous from end to end between the limiting-shoulders on the core. In case a ribbon of lead is used each flange has a slit $f'$ cut radially in each of the intermediate abutting flanges for the passage of the ribbon. This subdivision of an electrode which is long and narrow into comparatively-short sections is for the purpose of providing means to prevent the expansion of the active elements in the electrode from distorting it. If the ribbon extended from end to end of the core and the latter was of any considerable length, the expansion of the ribbon or of the equivalent flange would twist and distort the core in such manner as to greatly decrease its efficiency, if not short-circuit the battery by the contact of two twisted cores of opposite polarity. Another advantage of the division of the core into sections is the prevention of the crawling of the ribbon or equivalent flanges, between which the active element exists in the form of a spongy lead or of peroxid. A result of the crawling is to push out and throw down the active material to an undesirable extent.

By making the electrode in sections, as described, and dividing up the ribbon and equivalent form of holder on the core into short lengths the shedding or scaling of the active element is reduced to a minimum. The plate $h$ is made in skeleton form, as shown in Fig. 2 of the drawings, with openings $h'$, through which any particles of peroxid or spongy lead may fall onto the bottom plate, and thus prevent the building up of an electrical bridge between any two electrodes of opposite polarity. The material that may fall in small quantities upon the lower plate will, however, be quickly converted by electrochemical action to a form that unites with and increases the electrical capacity of the lower plate.

A modified form of the electrode is shown in Fig. 4 of the drawings, where the core $e'$ is tubular with perforations $e^2$ through its wall, the flange $f^2$ dividing the surface of the core into sections and forming abutments to take the thrust due to the expansion of the metallic ribbon wound on the core or of an equivalent form of holder for the active elements precisely as in the form of electrode shown in Figs. 1 and 3 of the drawings. A main advantage of the hollow core in the electrode is the increased activity and efficiency of the cell due to the more thorough circulation and contact of the liquid element throughout the cell.

The metallic ribbon wound upon the core and at right angles thereto with narrow spaces between the coils or turns is the preferred form of means for holding the peroxid or spongy lead; but any other form of radially-arranged flanges, whether located helically upon the core or parallel to each other, will serve equally well the purpose of a holder, and such forms are contemplated by me as part of my invention.

Another feature of my invention is found in the arrangement of the electrodes in rows in two directions in which those of different polarity are alternated. This is illustrated in Fig. 2 of the drawings, where the grid is seen in plan view. By this arrangement of the electrodes provision is made for a more uniform distribution of the electrolyte about them, and in the passage of the charging-current from the positive to the negative electrode a path is open in at least three directions to the negative electrodes, which are equally distributed about the positive element. If in the case of the middle electrode, as shown in Fig. 2, a negative electrode should become charged before the other three negative electrodes arranged about the one in question, then the current would pass beyond it and to another negative electrode which may not have been charged, thus increasing the rapidity of the action. This regular arrangement of the electrodes and alternately as to polarity, as described, also secures a more uniform action between the elements both in charging and discharging the cell. The resistance offered by the electrolyte is substantially the same between each of the several elements. This advantage is a material one, both in economy and efficiency of the battery or cell. The electrode shown herein is circular in outline in cross-section; but that is not material, as the cross-sectional shape may be varied at will without affecting any feature of invention.

I claim as my invention—

1. In a battery-electrode, a core provided with a number of rigid flanges disposed at intervals along the core and forming abutments, and a holder for an active material arranged about the core and so disposed as to form a series of annular flanges, and means including said rigid flanges, adapted to prevent movement of the holder except for portions of its length.

2. A battery-electrode comprising a core, a number of rigid flanges forming fixed abutments disposed at intervals along the core from end to end, and a metallic ribbon wound about the core between each pair of abutments the several turns projecting from the core and the several sections electrically connected from end to end of the electrode.

3. A battery-electrode comprising a tubular core with the walls of the tube perforated and provided with flanges disposed at intervals along its length providing fixed abutments, and a metallic holder for an active material located on the core providing annular flanges arranged at right angles to the surface of the core.

4. In combination in a grid for an accumulator or storage-cell, two sets of electrodes of opposite polarity, a bottom plate electrically connected to one set of electrodes, a second plate electrically connected to the other set of electrodes and with openings through which the first set pass, a supporting-plate of nonconducting material uniting the electrodes at the opposite ends and each electrode made up of a core divided into sections by fixed abutments, and means for holding an active material between the abutments and electrically connected from end to end of the core.

5. In a storage-cell, in combination, a bottom plate united to one set of electrodes, a plate above the first-named plate perforated for the free passage of the first set of electrodes, and a second set of electrodes electrically connected to the upper plate and insulated from the lower, the said electrodes being arranged in rows in two directions and alternating in polarity in both rows.

FRED W. BARHOFF.

Witnesses:
WILLIAM H. BARKER,
ERMA P. COFFRIN.